(12) United States Patent
Miller et al.

(10) Patent No.: US 7,141,232 B2
(45) Date of Patent: Nov. 28, 2006

(54) PREPARATION OF MOLECULAR SIEVES INVOLVING SPRAY DRYING

(75) Inventors: Stephen J. Miller, San Francisco, CA (US); David Allen Cooper, Morrisville, PA (US); Gerald Martin Woltermann, Harleysville, PA (US); William Edward Cormier, Lansdale, PA (US)

(73) Assignees: Chevron U.S.A. Inc., San Ramon, CA (US); PQ Corporation, Valley Forge, PA (US)

( * ) Notice: Subject to any disclaimer, the term of this patent is extended or adjusted under 35 U.S.C. 154(b) by 0 days.

(21) Appl. No.: 11/107,496

(22) Filed: Apr. 14, 2005

(65) Prior Publication Data

US 2005/0271583 A1 Dec. 8, 2005

Related U.S. Application Data

(63) Continuation-in-part of application No. 10/671,313, filed on Sep. 24, 2003, now abandoned.

(51) Int. Cl.
| | |
|---|---|
| C01B 39/04 | (2006.01) |
| C01B 39/40 | (2006.01) |
| C01B 39/48 | (2006.01) |
| B01J 29/40 | (2006.01) |
| B01J 29/06 | (2006.01) |

(52) U.S. Cl. ............. 423/716; 423/709; 423/717; 423/DIG. 22; 423/DIG. 27; 502/60; 502/77

(58) Field of Classification Search ........... 423/709, 423/712, 716, 717, DIG. 22, DIG. 27; 502/60, 502/77
See application file for complete search history.

(56) References Cited

U.S. PATENT DOCUMENTS

| | | | | |
|---|---|---|---|---|
| 3,094,383 A | * | 6/1963 | Dzierzanowski et al. ... | 423/701 |
| 3,119,659 A | * | 1/1964 | Taggart et al. ............ | 423/710 |
| 3,119,660 A | * | 1/1964 | Howell et al. ............ | 423/710 |
| 3,506,594 A | * | 4/1970 | Dzierzanowski et al. ..... | 502/68 |
| 3,702,886 A | * | 11/1972 | Argauer ................ | 423/705 |
| 3,773,690 A | * | 11/1973 | Heinze et al. ............ | 502/8 |
| 3,777,006 A | * | 12/1973 | Rundel ................ | 423/709 |
| 4,058,586 A | * | 11/1977 | Chi et al. ................ | 423/712 |
| 4,091,007 A | * | 5/1978 | Dwyer et al. ............ | 556/173 |
| 4,235,753 A | * | 11/1980 | Brown et al. ............ | 502/68 |
| 4,424,144 A | * | 1/1984 | Pryor et al. ............ | 502/68 |
| 4,522,705 A | * | 6/1985 | Chu et al. ............ | 208/120.05 |
| 4,560,542 A | * | 12/1985 | Robson ................ | 423/703 |
| 4,977,120 A | * | 12/1990 | Sakurada et al. ........ | 502/64 |
| 5,145,659 A | * | 9/1992 | McWilliams ............ | 423/713 |
| 5,240,892 A | * | 8/1993 | Klocke ................ | 502/77 |
| 5,558,851 A | * | 9/1996 | Miller ................ | 423/702 |
| 6,004,527 A | * | 12/1999 | Murrell et al. .......... | 423/712 |
| 6,106,803 A | * | 8/2000 | Hasenzahl et al. ........ | 423/705 |
| 6,261,534 B1 | * | 7/2001 | Miller ................ | 423/700 |

FOREIGN PATENT DOCUMENTS

| | | | | |
|---|---|---|---|---|
| EP | 156595 A2 | * | 10/1985 | |
| EP | 284206 A1 | * | 9/1988 | |
| EP | 1232999 A1 | * | 8/2002 | |
| GB | 1567856 A | * | 5/1980 | |
| GB | 2160517 A | * | 12/1985 | |
| WO | WO 92/12928 | * | 8/1992 | |

OTHER PUBLICATIONS

Aiello et al., Materials Engineering, 1992, vol. 3, No. 3 pp. 407-416.*
Li et al., Zeolites, 1992, vol. 12, Apr./May. pp. 343-346.*
Wenyang et al., Zeolites, vol. 10, Nov./Dec. 1990, pp. 753-759.*
Webyang et al., Zeolites, vol. 9, Nov. 1989, vol. 9, pp. 468-473.*
Bibby et al., Nature, vol. 317(12), Sep. 1985, pp. 157-158.*
Qisheng et al., J. Chem., Soc., Chem. Commun., 1988, pp. 659.*

* cited by examiner

*Primary Examiner*—David Sample
(74) *Attorney, Agent, or Firm*—Richard J. Sheridan

(57) ABSTRACT

Molecular sieves are prepared by forming a reaction mixture slurry, spray drying the reaction mixture slurry to form particles, and heating the spray dried reaction mixture at a temperature and pressure sufficient to cause crystallization of the molecular sieve. The reaction mixture contains an organic templating agent capable of forming the molecular sieve. The template may be added to the reaction mixture either by adding all of the template prior to spray drying, or by adding a portion of the template prior to spray drying with the remainder being added after spray drying.

15 Claims, No Drawings

PREPARATION OF MOLECULAR SIEVES INVOLVING SPRAY DRYING

This application is a continuation-in-part of Ser. No. 10/671,313, filed Sep. 24, 2003 now abandoned.

This invention was made with United States Government support under Cooperative Agreement No. 70NANB7H3014 awarded by NIST. The United States Government has certain rights in this invention.

FIELD OF THE INVENTION

The present invention relates to a process for producing crystalline molecular sieves, including zeolites, employing a spray drying step.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Natural and synthetic crystalline molecular sieves are useful as catalysts and adsorbents. The adsorptive and catalytic properties of each molecular sieve are determined in part by the dimensions of its pores and cavities. Thus, the utility of a particular molecular sieve in a particular application depends at least partly on its crystal structure. Because of their unique sieving characteristics, as well as their catalytic properties, molecular sieves are especially useful in such applications as gas drying and separation and hydrocarbon conversion. The term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process. Zeolites are included in the term "molecular sieve".

Prior art methods of preparing crystalline zeolites typically produce finely divided crystals which must be separated from an excess of liquid in which the zeolite is crystallized. The liquid, in turn, must be treated for reuse or else be discarded, with potentially deleterious environmental consequences. Preparing commercially useful catalytic materials which contain the powdered zeolite also normally requires additional binding and forming steps. Typically, the zeolite powder as crystallized must be mixed with a binder material and then formed into shaped particles or agglomerates, using methods such as extruding, agglomeration, and the like. These binding and forming steps greatly increase the complexity of catalyst manufacture involving, e.g., zeolitic materials. The additional steps may also have an adverse effect on the catalytic performance of the zeolite so bound and formed.

A number of processes have been offered for preparing crystalline zeolites within discrete particles. For example, Howell, et al., in U.S. Pat. No. 3,119,660 teaches a method for producing crystalline metal aluminosilicate zeolite by reacting preformed bodies of clay particles in an aqueous reactant mixture including alkali metal oxide. Similar processes for preparing zeolites from formed bodies, which may contain zeolitic seed crystals, in alkali solutions are also taught in U.S. Pat. No. 4,424,144 to Pryor, et al., U.S. Pat. No. 4,235,753 to Brown, et al., U.S. Pat. No. 3,777,006 to Rundell, et al., U.S. Pat. No. 3,119,659 to Taggart, et al, U.S. Pat. No. 3,773,690 to Heinze, et al., U.S. Pat. No. 4,977,120 to Sakurada, et al. and GB 2 160 517 A. U.S. Pat. No. 3,094,383 teaches a method of forming an A type zeolite by aging a homogeneous reaction mixture out of contact with an external aqueous liquid phase but under conditions to prevent the dehydration of the mixture. GB 1 567 856 discloses a method of preparing zeolite A by heating an extruded mixture of metakaolin powder and sodium hydroxide.

In U.S. Pat. No. 4,058,586, Chi, et al. discloses a method for crystallizing zeolites within formed particles containing added powdered zeolite, where the formed particles furnish all of the liquid needed for crystallization. Crystallizing the particles in an aqueous alkaline solution is not required using the process of Chi, et al.

Verduijn, in WO 92/12928, teaches a method of preparing binder-free zeolite aggregates by aging silica-bound extruded zeolites in an aqueous ionic solution containing hydroxy ions. According to the disclosure of Verduijn, the presence of zeolite crystals in the extrudate is critical for making strong crystalline zeolite extrudates. Verduijn, et al., in EPO A1/0,284,206, describe a method of preparing binderless zeolite L by forming silica and preferably 10–50 wt % performed zeolite L crystallites into particles, and then reacting the particles with an alkaline solution containing a source of alumina to form the zeolite L.

More recently, similar methods have been proposed for preparing high silica zeolitic materials. Conventional methods for preparing high silica materials, having a $SiO_2/Al_2O_3$ molar ratio of greater than about 10, and more typically greater than about 20, typically involves crystallizing the zeolites from aqueous solution. For example, U.S. Pat. No. 3,702,886 to Argauer, et al., teaches a method of preparing ZSM-5 from a solution containing tetrapropyl ammonium hydroxide, sodium oxide, an oxide of aluminum or gallium, an oxide of silica or germanium, and water. The digestion of the gel particles is carried out until crystals form. The crystals are separated from the liquid and recovered.

EPO A2/0,156,595, discloses the preparation of crystalline zeolites having a silica to alumina mole ratio greater than 12 and a Constraint Index of 1 to 12 by forming a mixture of seed crystals, a source of silica, a source of alumina and water into shaped particles, which are then crystallized in an aqueous reaction mixture containing a source of alkali cations. It is also taught that alumina-containing clay may be used as an alumina source. U.S. Pat. No. 4,522,705 is directed to a catalytic cracking catalyst comprising an additive prepared by the in-situ crystallization of a clay aggregate disclosed in EPO A2/0,156,595.

Special methods for preparing the reaction mixture from which a zeolite may be crystallized have also been proposed. In U.S. Pat. No. 4,560,542 a dried hydrogel containing silica and alumina is contacted with a fluid medium containing an organic templating agent and maintained at specified crystallization conditions to form a crystalline aluminosilicate. In U.S. Pat. No. 5,240,892 a reaction mixture containing at least about 30 weight percent solids content of alumina and precipitated silica is taught for preparing zeolites. The method of preparing the reaction mixture allows agitation of the mixture during crystallization, in spite of the high solids content of the mixture.

Zeolite crystallization from reaction mixtures initially containing a gel-like phase in equilibrium with an excess of liquid phase is disclosed in R. Aiello, et al., "Zeolite Crystallization from Dense Systems", Materials Engineering 1992, Vol. 3, n. 3, pp. 407–416.

Other approaches to synthesis of crystalline zeolites have included preparing the zeolites in an essentially aqueous-free environment. These non-aqueous methods have been described, for example, in ZEOLITES, 1992, Vol. 12, April/May, p. 343; ZEOLITES 1990, Vol. 10, November/December, p. 753; ZEOLITES 1989, Vol. 9, November, p. 468; Nature, Vol. 317(12), September 1985, p. 157; and J. Chem. Soc., Chem. Commun., 1988, p. 1486. J. Chem. Soc., Chem. Commun., 1993, p. 659 describes a kneading method for synthesizing ZSM-35 in a nonaqueous system, in which the amount of liquids used to prepare a crystallization mixture is not sufficient to wet all the solid particles so that the conglomerate reactant is actually a mixture of dry powder and small doughy lumps.

U.S. Pat. No. 6,004,527, issued Dec. 21, 1999 to Murrell et al. relates to the hydrothermal synthesis of large pore molecular sieves from nutrients, at least one of which contains an amorphous framework-structure, and which framework-structure is essentially retained in the synthetic molecular sieve. The synthesis involves impregnating a cation oxide framework comprising a first cation oxide with a liquid containing a second cation different from the first cation, said liquid being free of a pore forming agent. The impregnated cation oxide framework is dried and impregnated again with a liquid containing a pore forming agent. The amount of liquid containing the pore forming agent in the second impregnation does not exceed the incipient wetness point of the cation oxide framework. The impregnated cation oxide framework is then heated to produce a large pore molecular sieve.

U.S. Pat. No. 5,558,851, issued Sep. 24, 1996 to Miller, discloses a method for preparing a crystalline zeolite from a reaction mixture containing only enough water so the reaction mixture can be shaped if desired. The reaction mixture is heated at crystallization conditions and in the absence of an external liquid phase, so that excess liquid need not be removed from the crystallized material prior to drying the crystals.

U.S. Pat. No. 4,091,007, issued May 23, 1978 to Dwyer et al., discloses a method for preparing a crystalline aluminosilicate zeolite having uniform pores and greater than 40 percent crystallinity which comprises forming a critical reaction mixture containing a source of at least two cations, silica, alumina and water, wherein at least about 70 weight percent of the alumina is provided to the reaction mixture by an alumina-containing clay being added thereto. The reaction mixture is maintained at a temperature and pressure for a time necessary to crystallize the crystalline aluminosilicate. It is stated that it is desirable to preform the reaction mixture into discrete particles such as pellets or extrudates which retain their shape and acquire substantial strength in the crystallization process.

In Example 22, Dwyer et al. discloses the synthesis of ZSM-5 by mixing Georgia kaolin, Ludox colloidal silica and water. The mixture is dried in a Koline-Sanderson spray drier. More than 30% of the spray dried particles are larger than 200 mesh. The particles are calcined in air, and a portion of them mixed with a solution containing tetrapropylammonium bromide, NaOH pellets, Q-brand sodium silicate, NaCl and water. The resulting mixture is transferred to a static bomb and placed in a heated oil bath. Crystals are recovered and determined to be 50 weight percent crystalline ZSM-5.

SUMMARY OF THE INVENTION

In accordance with the present invention, there is provided a method of preparing a crystalline molecular sieve comprising:

a. forming an aqueous slurry comprising an active source of silicon oxide and an organic templating agent capable of forming the molecular sieve;

b. spray drying the aqueous slurry to form particles;

c. heating the spray dried particles at a temperature and pressure sufficient to cause crystallization of the molecular sieve.

Step c may be conducted in the absence of added water. The aqueous slurry may also contain an active source of an alkali metal oxide and/or an active source of the oxides of aluminum, boron, iron, gallium, indium, titanium, or mixtures thereof. The aqueous slurry may also contain seed crystals of the molecular sieve. The molecular sieve may be a zeolite, such as ZSM-5 or beta. The molecular sieve may have a mole ratio of silicon oxide to the oxides of aluminum, boron, iron, gallium, indium, titanium, or mixtures thereof is greater than 12.

The present invention also provides a method of preparing a crystalline molecular sieve comprising:

a. forming an aqueous slurry comprising an active source of silicon oxide and an organic templating agent capable of forming the molecular sieve;

b. spray drying the aqueous slurry to form particles;

c. adding additional organic templating agent to the spray dried particles to form a slurry; and d. heating the slurry from step c at a temperature and pressure sufficient to cause crystallization of the molecular sieve.

The aqueous slurry may also contain an active source of an alkali metal oxide and/or an active source of the oxides of aluminum, boron, iron, gallium, indium, titanium, or mixtures thereof. The aqueous slurry may also contain seed crystals of the molecular sieve. The molecular sieve may be a zeolite, such as ZSM-5 or beta. The molecular sieve may have a mole ratio of silicon oxide to the oxides of aluminum, boron, iron, gallium, indium, titanium, or mixtures thereof is greater than 12.

DETAILED DESCRIPTION OF THE INVENTION

The reaction mixture from which the molecular sieve is crystallized is an aqueous slurry and comprises at least one active source of silica, optionally an organic templating agent, and optionally active sources of metal oxides.

The solids content of the reaction mixture will depend on the molecular sieve desired. However, the reaction mixture should contain sufficient water such that, prior to spray drying, the reaction mixture has a solids content of about 10–20 weight percent.

The molecular sieve made by the present process typically has a silica to alumina mole ratio of greater than 12. Zeolites having a very high silica to alumina ratio are within the scope of the process, including zeolites having a silica to alumina mole ratio greater than 100. Also included are zeolites which are essentially aluminum-free. Especially when commercial silica sources are used, aluminum is almost always present to a greater or lesser degree. Thus, by "aluminum-free" is meant that no aluminum is intentionally added to the reaction mixture, e.g., as an alumina or aluminate reagent, and that to the extent aluminum is present, it occurs only as a contaminant in the reagents.

The aqueous slurry may contain active sources metal oxides, such as the oxides of aluminum, boron, iron, gallium, indium, titanium, or mixtures thereof.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$)), kaolin clays, and other zeolites. Titanium, gallium, iron, boron and indium can be added in forms corresponding to their aluminum and silicon counterparts. Salts, particularly alkali metal halides such as sodium chloride, can be added to or formed in the reaction mixture. They are disclosed in the literature as aiding the crystallization of zeolites while preventing silica occlusion in the lattice.

An organic templating agent capable forming the zeolite is included in the reaction mixture. Typically, the templating agent will be an organic compound which contains nitrogen or phosphorus. The sources of organic nitrogen-containing cations may be primary, secondary or tertiary amines or quaternary ammonium compounds, depending on the particular molecular sieve product to result from crystallization from the reaction mixture. Non-limiting examples of quaternary ammonium compounds include salts of tetramethylammonium, tetraethylammonium, tetrapropylammonium, tetrabutylammonium, dibenzyldimethylammonium, dibenzyldiethylammonium, benzyltrimethylammonium and 2-(hydroxylalkyl) trialkylammonium, where alkyl is methyl, or ethyl or a combination thereof. Non-limiting examples of amines useful in the present process include the compounds of trimethylamine, triethylamine, tripropylamine, ethylenediamine, propanediamine, butanediamine, pentanediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine. Amines useful herein are those having a $pK_a$ in the range of between about 7 and about 12.

It has been found that the organic templating agent may be added in two manners. First, all of the template can be added to the reaction mixture prior to spray drying. This has been found to result in zeolites having good crystallinity. Alternatively, a portion of the template can be added to the reaction mixture prior to spray drying, with the remainder of the template being added to the spray dried material prior to reaction. It has been found that adding all of the template to the spray dried material prior to reaction may result in no crystallization (see Comparative Example H).

The reaction mixture may also comprise one or more active sources of alkali metal oxide. Sources of lithium, sodium and potassium, are preferred. Any alkali metal compound which is not detrimental to the crystallization process is suitable here. Non-limiting examples include oxides, hydroxides, nitrates, sulfates, halogenides, oxalates, citrates and acetates. According to the present process, a reaction mixture is prepared having a composition, in terms of mc

|  | Broad | Preferred |
| --- | --- | --- |
| $YO_2/W_aO_b$ | 2–∞ | 12–∞ |
| $M^+/YO_2$ | 0–1 | 0.04–0.7 |
| $R/YO_2$ | 0–0.5 | 0.01–0.3 |
| $OH^-/YO_2$ | 0.05–0.4 | 0.05–0.3 |
| $H_2O/YO_2$ | 0.5–5 | 1–4 |

Y is silicon, germanium or both, W is aluminum, boron, iron, gallium, indium, titanium, or a mixture thereof, a is 1 or 2, b is 2 when a is 1 (i.e., W is tetravalent) and b is 3 when a is 2 (i.e., W is trivalent), $M^+$ is an alkali metal ion, preferably sodium, and R is a templating agent. The type of molecular sieve crystallized from the reaction mixture depends on a number of factors, including crystallization conditions, specific composition of the reaction mixture and the type of templating agent used.

In a preferred method of the present invention, a reaction mixture is formed containing one or more sources of alkali metal oxide, organic nitrogen-containing cations, hydrogen ions, an oxide of silicon, water, and optionally, an oxide of aluminum. In general, the reaction mixture will have a pH of at least 7, and preferably between about 8 and 14.

Once the aqueous slurry reaction mixture is formed, it is spray dried to form particles. Spray drying is a direct fired method of drying slurries or solutions, which is an extremely important process for producing microspheres for fluid bed or slurry catalysts or adsorbents as well as other applications. Spray drying involves feeding a well dispersed liquid-solid slurry or solution, often containing a binder, to an atomizer and subsequently flash drying in a stream of hot air. The atomizer can be of several different types. Most common is wheel atomization, which uses high speed rotation of a wheel or disc to break up the slurry into droplets that spin out from the wheel into chamber and are flash dried prior to hitting the chamber walls. The atomization may also be accomplished by single fluid nozzles, which rely on hydrostatic pressure to force the slurry through a small nozzle. Multi-fluid nozzles are also used, where gas pressure is used to force the slurry through the nozzle. After drying, the heavier particles can be collected at the bottom of the chamber, while smaller, lighter particles are collected in cyclones and/or bag houses. Alternately, all particles can be collected in a bag house. The dry airflow can be tangential, co-current or counter current depending on the design of the dryer.

In most fluid bed operations, particle size of the catalyst is an important factor and generally requires an average particle size between 65 and 80 microns. A narrow particle size distribution is also desirable with a range between 10 and 200 microns. It is important in most operations to limit the amount of particles less than 20 microns to below 5 wt. % and above 150 microns to less than 5 wt. %. This facilitates catalyst-product separation, while at the same time allowing good fluidization of the bed. Particle size can be controlled by nozzle size or wheel speed and design as well as slurry solids content and viscosity, and also by the velocity and direction of the air with respect to the atomizer.

Particle morphology is also important and is mostly controlled by the spray dryer operation. It is important to avoid secondary atomization, impingement of fine dry particles on wet droplets and blowholes in order to avoid non-spherical particles. The inlet temperature of the drying air and slurry solids content can be varied to minimize blowholes, while secondary atomization can be controlled by nozzle or wheel design. The impingement of small, dry particles onto wet droplets can be minimized by correct control of air flow and direction and minimizing secondary atomization.

Other important parameters, such as particle bulk density and hardness, are generally controlled by the feed slurry. While high density and particle hardness are for the most part desirable, the particle can not be so dense that it inhibits fluidization nor so hard as to cause erosion of equipment.

The slurry particle size has the largest impact on density and hardness, but type of binder and particle surface charge are also important factors.

Crystallization is conducted at an elevated temperature and usually in an autoclave so that the reaction mixture is subject to autogenous pressure until the crystals of the molecular sieve are formed. The temperatures during the hydrothermal crystallization step are typically maintained from about 80° C. to about 200° C., preferably from about 90° C. to about 180° C. an more preferably from about 100° C. to about 170° C.

Once the molecular sieve crystals have formed, the crystals may be water-washed and then dried, e.g., at 90° C. to 150° C. for from 8 to 24 hours. The drying step can be performed at atmospheric or subatmospheric pressures.

Crystalline material (i.e. "seed" crystals) may be added to the mixture prior to the crystallization step, and methods for enhancing the crystallization of zeolites by adding "seed" crystals are well known. However, the addition of seed crystals is not a requirement of the present process. Indeed, it is an important feature of the present process that zeolites can be crystallized within the reaction mixture in the absence of crystals added prior to the crystallization step. When they are used, the seed crystals may be crystals of the desired molecular sieve, or crystals of a different molecular sieve. When seed crystals are used, they are typically added in an amount between 0.1 and 10% of the weight of $YO_2$, e.g. silica, used in the reaction mixture.

In one general embodiment, the present method is applicable to the synthesis of zeolites having a silica/alumina molar ratio greater than 12. In a more specific embodiment, the method is useful for preparing silicate and aluminosilicate zeolites having a Constraint Index of greater than about 1. The Constraint Index as used herein is defined in J. Catalysis 67, page 218 and also disclosed in U.S. Pat. No. 4,481,177.

Specific, non-limiting examples of crystalline zeolites which may be prepared by the present method include ZSM-5, beta and other similar materials.

Zeolite ZSM-5 and the conventional preparation thereof are described in U.S. Pat. No. 3,702,886, the disclosure of which is incorporated herein by reference. The reaction mixture from which ZSM-5 can be suitably prepared is formed by mixing sources of silica and alumina with a templating agent, preferably tetrapropylammonium hydroxide, and sources of an alkali metal oxide, preferably sodium oxide.

Zeolite beta and the conventional preparation thereof are described in U.S. Pat. No. 3,308,069, the disclosure of which is incorporated herein by reference. The reaction mixture from which zeolite beta can be suitably prepared is formed by mixing sources of silica and alumina with a templating agent, preferably tetraethylammonium hydroxide (TEAOH), and sources of an alkali metal oxide, preferably sodium oxide. The crystallization procedures can be satisfactorily carried out at temperatures within the range from about 75° C. to about 200° C. Heating under autogenous pressure is carried out until desired crystalline zeolite product is formed.

Zeolite boron beta and the conventional preparation thereof are described in U.S. Pat. Nos. 4,788,169 and 5,166,111, the disclosures of which are incorporated herein by reference. Boron beta zeolites can be suitably prepared from a reaction mixture containing sources of an alkali metal borate, a templating agent such as tetraethylammonium hydroxide or bis(1-azonia, bicyclo[2.2.2]octane)-α, ω alkane diquaternary ammonium ion, and an oxide of silicon or germanium, or mixture of the two.

Sources of boron for the reaction mixture include borosilicate glasses and most particularly, other reactive borates such as sodium borate and borate esters. Typical sources of silicon oxide include precipitated silica, silicates, silica hydrogel, silicic acid, colloidal silica, tetra-alkyl or/hosilicates, and silica hydroxides.

EXAMPLES

The following examples illustrate the invention. The stoichiometry for the reaction mixtures used in each example is shown in Table 2 below.

Example 1

154 pounds of deionized water (DI $H_2O$) and 35.6 pounds of a 35% tetraethylammonium hydroxide (TEAOH) solution was added to a 100 gallon Cowles dissolver. The mixer was turned on and 44.9 pounds HiSil 233 (90% $SiO_2$, 10% $H_2O$) was added over 25 minutes. After the HiSil addition was complete, 3.8 pounds of sodium hydroxide (50% solution), 2.95 pounds of Versal 250 (75% $Al_2O_3$, 25% $H_2O$) and 2.08 pounds sodium aluminate powder was added and the entire batch was mixed for 45 minutes prior to spray drying in a 10 foot spray dryer using the conditions shown in Table 1.

Example 2

22.4 pounds of HiSil 233 (90% $SiO_2$, 10% $H_2O$), 1.03 pounds of sodium aluminate powder and 1.48 pounds of Versal 250 (75% $Al_2O_3$, 25% $H_2O$) was added to a 130 liter plow shear mixer (Littleford type). The mixer was turned on and a solution made up of 17.8 pounds of DI $H_2O$, 17.8 pounds of TEAOH (35%) and 1.9 pounds of NaOH (50%) was injected into the mixer through a spray nozzle. The thick paste was mixed for 10 minutes and then without discharging the initial material a second batch was made using the exact same mixing sequence. The resulting thick paste was transferred from the Littleford mixer to a standard 30 gallon mix tank containing 28 pounds of DI $H_2O$. The slurry was mixed for 1 hour at 2000 RPM prior to spray drying in a 10 foot spray dryer using the conditions shown in Table 1.

Comparative Example A 10 grams of spray dried material from Example 1 was placed into three 45 ml Parr bombs. The bombs were sealed and placed in an oven at 150° C. for 24, 48 and 144 hours. After the bombs were removed from the oven, they were cooled and the material was filtered and washed with 100 cc of DI $H_2O$. All three samples were x-ray amorphous.

Comparative Example B 10 grams of spray dried material from Example 1 was placed in three 45 ml Parr bombs. 30 grams of DI $H_2O$ was added to the Parr bombs. The bombs were sealed and placed in an oven at 150° C. for 24, 48 and 288 hours. After the bombs were removed from the oven, they were cooled and the material was filtered and washed with 100 cc of DI $H_2O$. All three samples were x-ray amorphous.

Comparative Example C

The slurry fed to the spray dryer in Example 1 had a pH of 12.2. The spray dried material had a pH of 10.3. 15 grams of spray dried material from Example 1 was placed into a 125 ml Parr bomb. 60 grams of DI $H_2O$ was added to the Parr bomb to form a slurry. The pH of the slurry was increased to 12.3 by the addition of 2.4 gm of 25% NaOH. The Parr bomb was sealed and placed in an oven at 150° C. for 48 hours. The bomb was removed from the oven, cooled and the material was filtered and washed with 100 cc of DI $H_2O$. The sample was x-ray amorphous.

Comparative Example D 15 grams of spray dried material from Example 1 was placed into a 125 ml Parr bomb. 60 grams of DI $H_2O$ was added to the Parr bomb to form a slurry. The pH of the slurry was increased to 13.0 by the addition of 3.4 gm of 25% NaOH. The Parr bomb was sealed and placed in an oven at 150° C. for 48 hours. The bomb was removed from the oven, cooled and the material was filtered and washed with 100 cc of DI $H_2O$. The sample was x-ray amorphous.

Comparative Example E 10 grams of spray dried material from Example 2 was placed into three 45 ml Parr bombs. The bombs were sealed and placed in an oven at 150° C. for 24, 48 and 144 hours. After the bombs were removed from the oven, they were cooled and the material was filtered and washed with 100 cc of DI $H_2O$. All the samples were x-ray amorphous.

Comparative Example F 10 grams of spray dried material from Example 2 was placed into two 45 ml Parr bombs. 30 grams of DI $H_2O$ was added to the Parr bombs. They were sealed and placed in an oven at 150° C. for 24 and 288 hours. After the bombs were removed from the oven, they were cooled and the material was filtered and washed with 100 cc of DI $H_2O$. Both samples were x-ray amorphous.

Comparative Example G

The slurry fed to the spray dryer in Example 2 had a pH of 12.5. The spray dried material had a pH of 10.2. 15.6 grams of spray dried material from Example 2 was placed into a 125 ml Parr bomb. Sixty grams of DI $H_2O$ was added to the Parr bomb to form a slurry. The pH of the slurry was increased to 13.0 by the addition of 3.1 gm of 25% NaOH. The Parr bomb was sealed and placed in an oven at 150° C. for 48 hours. The bomb was removed from the oven, cooled and the material was filtered and washed with 100 cc of DI $H_2O$. The sample was x-ray amorphous.

Example 3

Adding Organic Template to the Spray Dried Material 10.8 gm of spray dried material from Example 1 was placed into two 45 ml Parr bombs. 30 gms of DI $H_2O$ was added to each bomb and then 5.0 gm of 35% TEAOH solution was added. The bombs were sealed and placed in an oven at 150° C. for 24 and 48 hours. After the bombs were removed from the oven, they were cooled and the material was filtered and washed with 100 cc of DI $H_2O$. The 24 hour sample showed a small amount of crystalline zeolite beta. The 48 hour sample was highly crystalline, phase pure beta.

Example 4

Adding Organic Template to the Spray Dried Material 10.8 gm of spray dried material from Example 2 was placed into two 45 ml Parr bombs. 30 grams of DI $H_2O$ was added to each bomb and then 5.0 gm of 35% TEAOH solution was added. The bombs were sealed and placed in an oven at 150° C. for 26 and 48 hours. After the bombs were removed from the oven, they were cooled and the material was filtered and washed with 100 cc of DI $H_2O$. The 26 hour sample was partially crystalline zeolite beta. The 48 hour sample was highly crystalline phase pure beta. Five grams of the crystalline sample was slurried in 50 ml of DI $H_2O$ containing 5 grams of ammonium nitrate. After 1 hour at 80° C. the sample was filtered, washed and dried at 105° C. The dried sample was placed in a muffle furnace programmed to ramp to 550° C. in 6 hours and hold at 550° C. for 4 hours. The calcined H-form beta had a $N_2$ BET surface area of 704 $m^2/g$.

Example 5

196 pounds of DI $H_2O$ and 3.8 pounds of NaOH (50%) was added to a 100 gallon Cowles dissolver. The mixer was turned on and 44.9 pounds HiSil 233 (90% $SiO_2$, 10% $H_2O$) was added over 25 minutes. After the HiSil 233 addition was complete, 2.95 pounds of Versal 250 (75% $Al_2O_3$, 25% $H_2O$) and 2.08 pounds sodium aluminate powder was added and the entire batch was mixed for 45 minutes prior to spray drying in a 10 foot spray dryer using the conditions shown in Table 1.

Comparative Example H 35 gm of spray dried material from Example 5 was added to a solution consisting of 108 gm of DI $H_2O$ and 35.1 gm of TEAOH (35%). The thick slurry was poured into two Parr bombs which were sealed and placed in an oven at 150° C. for 47 and 71 hours. After the bombs were removed from the oven, they were cooled and the material was filtered and washed with 250 cc of DI $H_2O$. Both samples were x-ray amorphous.

Example 6

Effect of Stirring 327.1 Grams of spray dried material from Example 5 was added to a solution of 950 gm of DI $H_2O$ and 327.1 gm of TEAOH (35%), The resulting thick slurry was poured into a two liter autoclave equipped with an agitator. The slurry was heated to 150° C. in two hours with the agitator stirring at 100 RPM. The autoclave was maintained at 150° C. for 66 hours. After allowing the slurry to cool to room temperature, it was filtered and washed with 4 liters of DI $H_2O$. The resulting product was highly crystalline phase pure Beta. Five grams of the crystalline product was slurried in 50 ml of DI $H_2O$ containing five gm of ammonium nitrate. After one hour at 70° C. the sample was filtered, washed and dried at 105° C. The dried sample was placed in a muffle furnace programmed to ramp to 550° C. in six hours and hold at 550° C. for four hours. The $N_2$ BET surface area was 668 $m^2/gm$.

Example 7

The average particle size of the crystalline Beta from Example 6 was 25 um. The non-crystalline spray dried precursor from Example 5 had an average particle size of 109 um. 50 Grams of crystalline Beta from Example 6 was slurried in 500 gm of DI $H_2O$. The slurry was passed through a 270 US mesh screen. The 22.5 gm of +270 US mesh material had an average particle size of 90 um. It was highly crystalline phase pure Beta with a $N_2$ BET surface area after ammonium nitrate exchange and calcination (using the conditions of Example 6) of 686 $m^2/gm$.

Example 8

Spray Dried Beta with Crystalline Seed Added

3080 Grams of DI $H_2O$, 712 gm TEAOH (35%) and 60.8 gm of NaOH (50%) were added to a five gallon mix tank. The mixer was turned on and 898 gm of HiSil 233 (90% $SiO_2$, 10% $H_2O$) was added over 15 minutes. After the HiSil 233 addition was complete, 59 gm of Versal 250 (75% $Al_2O_3$, 25% $H_2O$) was added and mixed for five minutes. After five minutes, 106.4 gm of SoAl 235 (23.5% Al2O3, 19.6% Na2O) was added and mixed for five minutes. After five minutes, 44 gm of CP814E (commercially produced NH4+Beta) was added and mixed for 15 minutes prior to spray drying in a three foot spray dryer with a feed rate of 60 ml/minute, an inlet set point temperature of 300° C. and an air pressure setting of five bar. The physical properties of the spray dried Beta precursor is shown in below.

| | |
|---|---|
| gm Seed/gm SiO2 | 0.05 |
| Particle Size D(v, 0.1) um | 5.9 |
| Particle Size D(v, 0.5) um | 26.5 |
| Particle Size D(v, 0.9) um | 58.2 |
| LOI @ 1000 C. (%) | 32.0 |

Example 9

Crystallization of Spray Dried Beta with Seed

10 Grams of spray dried material from Example 8 was placed into two 45 ml Parr bombs. The bombs were sealed and placed in an oven at 160° C. for 24 and 48 hours. After the bombs were removed from the oven, they were cooled and the material was filtered and washed with 100 cc of DI H2O. The 24 hour sample was approximately 50% crystalline Beta. The 48 hour sample was highly crystalline phase pure Beta.

Example 10

Spray Dried Beta Example with Crystalline Seed Added

169 Pounds DI $H_2O$ and 39.2 pounds of a 35% TEAOH solution was added to a 100 gallon Cowles dissolver. The mixer was turned on and 49.4 pounds HiSil 233 (90% $SiO_2$, 10% $H_2O$) was added over 25 minutes. After the HiSil 233 addition was complete 3.35 pounds of NaOH (50% solution), 3.25 pounds of Versal 250 (75% $Al_2O_3$, 25% $H_2O$) and 5.85 pounds SoAL 235 (23.5% Al2O3, 19.6% Na2O) was added and the batch was mixed for 15 minutes prior to the addition of 2.2 pounds of CP814E (commercially produced NH4+Beta). After 15 minutes the slurry was spray dried in a 10 foot spray dryer with a 550° F. inlet temperature, 265° F. outlet temperature and a wheel speed of 11,000 RPM. The physical properties of the spray dried Beta precursor is shown below.

| | |
|---|---|
| gm Seed/gm SiO2 | 0.05 |
| Particle Size D(v, 0.1) um | 36 |
| Particle Size D(v, 0.5) um | 116 |
| Particle Size D(v, 0.9) um | 209 |
| LOI @ 1000 C. (%) | 32.5 |

Comparative Example I

Crystallization of Spray Dried Beta with Seed

13 Grams of spray dried material from Example 10 was placed into two 45 ml Parr bombs. The bombs were sealed and placed in an oven at 160° C. for 24 and 48 hours. After the bombs were removed from the oven, they were cooled and the material was filtered and washed with 100 cc of DI H2O. Both samples were x-ray amorphous except for small peak likely due to the crystalline seed added during the spray drying step.

Comparative Example J

Crystallization of Spray Dried Beta with Seed

13 Grams of spray dried material from Example10 was placed into a 45 ml Parr bomb and 13.7 gm of DI H2O was added to form a thick slurry. The bomb was sealed and placed in an oven at 160° C. for 66 hours. After the bomb was removed from the oven, it was cooled and the material was filtered and washed with 100 cc of DI H2O. The sample was x-ray amorphous except for small peak likely due to the crystalline seed added during the spray drying step.

Example 11

Crystallization of Spray Dried Beta with Seed

13 Grams of spray dried material from Example10 was placed into a 45 ml Parr bomb and 2.6 gm of DI H2O was added dropwise while gently stirring the spray dried material with a spatula. The bomb was sealed and placed in an oven at 160° C. for 66 hours. After the bomb was removed from the oven, it was cooled and the material was filtered and washed with 100 cc of DI H2O. The 66 hour sample was highly crystalline phase pure Beta.

| Reaction Mixture (seeded) Stoichiometry (in moles) | | | | | | |
|---|---|---|---|---|---|---|
| | Example | | | | | |
| | 8 | 9 | 10 | I | J | 11 |
| SAR | 19.8 | 19.8 | 19.8 | 19.8 | 19.8 | 19.8 |
| TEA/SiO2 | 0.13 | 0.13 | 0.13 | 0.13 | 0.13 | 0.13 |
| OH/SiO2 | 0.23 | 0.23 | 0.23 | 0.23 | 0.23 | 0.23 |
| Na/SiO2 | 0.11 | 0.11 | 0.11 | 0.11 | 0.11 | 0.11 |
| H2O/SiO2 | 0.83 | 0.83 | 0.87 | 0.87 | 7.05 | 2.04 |
| Particle Size Distribution | | | | | | |
| D(v, 0.1) um | 5.9 | 5.9 | 36 | 36 | 36 | 36 |
| D(v, 0.5) um | 26.5 | 26.5 | 116 | 116 | 116 | 116 |
| D(v, 0.9) um | 58.2 | 58.2 | 209 | 209 | 209 | 209 |

Example 12

Spray Dried ZSM-5 with added Seed

3421 Grams of DI H2O and 357.1 gm of a 50% tetrapropylammonium bromide (TPABr) solution were added to a five gallon mix tank. The mixer was turned on and 1000 gm of HiSil 233 (90% $SiO_2$, 10% $H_2O$) was added over 15 minutes. After the HiSil 233 addition was complete 62.4 gm of SoAl 235 (23.5% Al2O3, 19.6% Na2O) was added and mixed for five minutes. After five minutes 218.3 gm of NaOH (50%) was added and mixed five minutes. After five minutes, 26.7 gm of CBV8010 (commercially available H+ form ZSM-5) was added and mixed five minutes prior to spray drying in a 3 foot spray dryer with a feed rate of 60 ml/minute an inlet set point temperature of 300° C. and an air pressure setting of 5.2 bar. The physical properties of the spray dried ZSM-5 precursor is shown below.

| | |
|---|---|
| gm Seed/gm SiO2 | 0.03 |
| Particle Size D(v, 0.1) um | 6.0 |
| Particle Size D(v, 0.5) um | 35.1 |
| Particle Size D(v, 0.9) um | 75.7 |
| LOI @ 1000 C. (%) | 22.6 |

Example 13

Crystallization of Spray Dried ZSM-5 with Seed

10 Grams of spray dried material from Example 12 was placed into four 45 ml Parr bombs. The bombs were sealed and placed in an oven at 160° C. for 3, 5, 8 and 66 hours. After the bombs were removed from the oven, they were cooled and the material was filtered and washed with 100 cc of DI H2O. The 3 hour sample was approximately 75% crystalline ZSM-5. The 5,8 and 66 hour samples were highly crystalline phase pure ZSM-5.

Example 14

Crystallization of Spray Dried ZSM-5 with Seed

10 Grams of spray dried material from Example 12 was placed into a 45 ml Parr bomb. The bomb was sealed and placed in an oven at 180° C. for three hours. After the bomb was removed from the oven it was cooled and the material was filtered and washed with 100 cc of DI H2O. The sample was highly crystalline phase pure ZSM-5.

Example 15

Crystallization of Spray Dried ZSM-5 with Seed

10 Grams of spray dried material from Example 12 was placed into a 45 ml Parr bomb. 20 Grams of DI H2O was added to form a slurry. The bomb was sealed and placed in an oven at 160° C. for 66 hours. After the bomb was removed from the oven, it was cooled and the material was filtered and washed with 100 cc of DI H2O. The sample was highly crystalline phase pure ZSM-5.

| Reaction Mixture (seeded) Stoichiometry (in moles) | | | | |
|---|---|---|---|---|
| | Example | | | |
| | 12 | 13 | 14 | 15 |
| SAR | 104 | 104 | 104 | 104 |
| TPA/SiO2 | 0.04 | 0.04 | 0.04 | 0.04 |
| OH/SiO2 | 0.21 | 0.21 | 0.21 | 0.21 |
| Na/SiO2 | 0.21 | 0.21 | 0.21 | 0.21 |
| H2O/SiO2 | 1.32 | 1.32 | 1.32 | 13.0 |
| Particle Size Distribution | | | | |
| D(v, 0.1) um | 6.0 | 6.0 | 6.0 | 6.0 |
| D(v, 0.5) um | 35.1 | 35.1 | 35.1 | 35.1 |
| D(v, 0.9) um | 75.7 | 75.7 | 75.7 | 75.7 |

Example 16

10 Grams of spray dried material from Example 1 was placed in a two 45 ml Parr bombs. 2.0 grams of DI $H_2O$ was added dropwise while gently stirring the spray dried material with a spatula. The bombs were sealed and placed in an oven at 160° C. for 39 and 137 hours. After the bombs were removed from the oven, they were cooled and the material was filtered and washed with 100 cc of DI $H_2O$. The 39 hour sample was x-ray amorphous while the 137 hour sample was 60% crystalline beta.

Comparative Example K

10 Grams of spray dried material from Example 1 was placed in a two 45 ml Parr bombs. 4.0 Grams of DI $H_2O$ was added dropwise while gently stirring the spray dried material with a spatula. The bombs were sealed and placed in an oven at 160° C. for 39 and 137 hours. After the bombs were removed from the oven, they were cooled and the material was filtered and washed with 100 cc of DI $H_2O$. Both samples were x-ray amorphous.

Comparative Example L

10 Grams of spray dried material from Example 1 was placed in a two 45 ml Parr bombs. 6.0 Grams of DI $H_2O$ was added dropwise while gently stirring the spray dried material with a spatula. The bombs were sealed and placed in an oven at 160° C. for 39 and 137 hours. After the bombs were removed from the oven, they were cooled and the material was filtered and washed with 100 cc of DI $H_2O$. Both samples were x-ray amorphous.

Reaction Mixture (non seeded) Stoichiometry (in moles)

| | Example | | |
|---|---|---|---|
| | 16 | K | L |
| SAR | 19.8 | 19.8 | 19.8 |
| TEA/SiO2 | 0.13 | 0.13 | 0.13 |
| OH/SiO2 | 0.23 | 0.23 | 0.23 |
| Na/SiO2 | 0.11 | 0.11 | 0.11 |
| H2O/SiO2 | 1.74 | 2.83 | 3.92 |
| Particle Size Distribution | | | |
| D(v, 0.1) um | 47 | 47 | 47 |
| D(v, 0.5) um | 120 | 120 | 120 |
| D(v, 0.9) um | 219 | 219 | 219 |

TABLE 1

Spray Drying Conditions

| Example | Inlet Temp, °F. (°C.) | Outlet Temp, °F. (°C.) | Wheel Speed | % LOI* | PSD (um) no ultrasound | | |
|---|---|---|---|---|---|---|---|
| | | | | | d(v, 0.5) | d(v, 0.1) | d(v, 0.9) |
| 1 | 600 (316) | 260 (127) | 11,500 | 30.5 | 120 | 47 | 219 |
| 2 | 600 (316) | 250 (121) | 11,500 | 26.7 | 90 | 35 | 199 |
| 12 | 610 (321) | 250 (121) | 12,000 | 10.9 | 109 | 49 | 201 |

*Loss on ignition

TABLE 2

Reaction Mixture (non-seeded) Stoichiometry (in moles)

| | Example | | | | | | | |
|---|---|---|---|---|---|---|---|---|
| | 1 | 2 | A | B | C | D | E | F |
| SAR* | 19.9 | 19.9 | 19.9 | 19.9 | 19.9 | 19.9 | 19.9 | 19.9 |
| TEA/SiO2 | 0.13 | 0.13 | 0.13 | 0.13 | 0.13 | 0.13 | 0.13 | 0.13 |
| OH/SiO2 | 0.23 | 0.23 | 0.23 | 0.23 | 0.33 | 0.37 | 0.23 | 0.23 |
| Na/SiO2 | 0.11 | 0.11 | 0.11 | 0.11 | 0.21 | 0.25 | 0.11 | 0.11 |
| H2O/SiO2 | 0.64 | 0.35 | 0.64 | 17.1 | 22.8 | 22.9 | 0.35 | 13.3 |

| | Example | | | | | | |
|---|---|---|---|---|---|---|---|
| | G | 3 | 4 | 5 | H | 6 | 7 |
| SAR | 19.9 | 19.9 | 19.9 | 19.9 | 19.9 | 19.9 | 19.9 |
| TEA/SiO2 | 0.13 | 0.23 | 0.23 | 0.00 | 0.19 | 0.18 | 0.18 |
| OH/SiO2 | 0.34 | 0.34 | 0.33 | 0.11 | 0.29 | 0.29 | 0.29 |
| Na/SiO2 | 0.22 | 0.11 | 0.11 | 0.11 | 0.11 | 0.11 | 0.11 |
| H2O/SiO2 | 19.5 | 17.5 | 16.3 | 0.47 | 16.5 | 15.6 | 15.6 |

*Silica/alumina mole ratio

What is claimed is:

1. A method of preparing a crystalline zeolite beta comprising:
   a. forming an aqueous slurry comprising an active source of silicon oxide and an organic templating agent capable of forming the zeolite beta;
   b. spray drying the aqueous slurry to form particles;
   c. heating the spray dried particles at a temperature and pressure sufficient to cause crystallization of the molecular sieve.

2. The method of claim 1 wherein step c is conducted in the absence of added water.

3. The method of claim 1 wherein the aqueous slurry further comprises an active source of an alkali metal oxide.

4. The method of claim 1 wherein the aqueous slurry further comprises an active source of the oxides of aluminum, boron, iron, gallium, indium, titanium, or mixtures thereof.

5. The method of claim 4 wherein the oxide is aluminum oxide.

6. The method of claim 1 wherein the aqueous slurry further comprises seed crystals of zeolite beta.

7. The method of claim 4 wherein the mole ratio of silicon oxide to the oxides of aluminum, boron, iron, gallium, indium, titanium, or mixtures thereof is greater than 12.

8. A method of preparing a crystalline molecular sieve comprising:
   a. forming an aqueous slurry comprising an active source of silicon oxide and an organic templating agent capable of forming the molecular sieve;
   b. spray drying the aqueous slurry to form particles;
   c. adding additional organic templating agent to the spray dried particles to form a slurry; and
   d. heating the slurry from step c at a temperature and pressure sufficient to cause crystallization of the molecular sieve.

9. The method of claim 8 wherein the aqueous slurry further comprises an active source of an alkali metal oxide.

10. The method of claim 8 wherein the aqueous slurry further comprises an active source of the oxides of aluminum, boron, iron, gallium, indium, titanium, or mixtures thereof.

11. The method of claim 10 wherein the oxide is aluminum oxide.

12. The method of claim 8 wherein the aqueous slurry further comprises seed crystals of the molecular sieve.

13. The method of claim 8 wherein the molecular sieve is the zeolite ZSM-5.

14. The method of claim 8 wherein the molecular sieve is zeolite beta.

15. The method of claim 10 wherein the mole ratio of silicon oxide to the oxides of aluminum, boron, iron, gallium, indium, titanium, or mixtures thereof is greater than 12.

* * * * *